(12) United States Patent
Arai

(10) Patent No.: US 8,218,876 B2
(45) Date of Patent: Jul. 10, 2012

(54) INFORMATION PROCESSING APPARATUS AND CONTROL METHOD

(75) Inventor: Tsunekazu Arai, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1172 days.

(21) Appl. No.: 11/941,711

(22) Filed: Nov. 16, 2007

(65) Prior Publication Data

US 2008/0154922 A1    Jun. 26, 2008

(30) Foreign Application Priority Data

Dec. 21, 2006 (JP) ................. 2006-344275

(51) Int. Cl.
*G06F 17/30* (2006.01)

(52) U.S. Cl. ..... 382/187; 382/181; 382/190; 707/999.1; 707/E17.009; 707/E17.026

(58) Field of Classification Search .............. 382/181, 382/187, 189; 707/999.1, E17.009, E17.026
See application file for complete search history.

(56) References Cited

U.S. PATENT DOCUMENTS

| 6,996,268 | B2 * | 2/2006 | Megiddo et al. | 382/159 |
| 7,295,719 | B2 * | 11/2007 | Robertson et al. | 382/305 |
| 7,451,090 | B2 * | 11/2008 | Nakagawa et al. | 704/275 |
| 7,593,961 | B2 * | 9/2009 | Eguchi et al. | 1/1 |
| 2001/0003182 | A1 * | 6/2001 | Labelle | 707/3 |

FOREIGN PATENT DOCUMENTS

| JP | 07-073190 A | 3/1995 |
| JP | 09-091424 A | 4/1997 |
| JP | 09-269952 A | 10/1997 |
| JP | 10-171835 A | 6/1998 |
| JP | 2005-236646 A | 9/2005 |

* cited by examiner

Primary Examiner — Stephen R Koziol

(74) Attorney, Agent, or Firm — Canon USA Inc., IP Division

(57) ABSTRACT

An information processing apparatus includes a storage unit configured to store dictionary data in which a locus and one or more pieces of content are registered in association with one another, an input unit configured to input a locus in association with content, a comparison unit configured to compare the locus input by the input unit and a locus registered in the dictionary data, and an addition unit configured to add data to the dictionary data stored in the storage unit based on a comparison result generated by the comparison unit.

8 Claims, 19 Drawing Sheets

FIG. 6

| Locus Feature Data | Locus Screen Position Information and File Information 1 | Locus Screen Position Information and File Information 2 | Locus Screen Position Information and File Information 3 | ..... |
|---|---|---|---|---|
|  | Locus Screen XY Coordinate Data 01.jpg | Locus Screen XY Coordinate Data 02.jpg | | |
|  | Locus Screen XY Coordinate Data 04.jpg | | | |
| 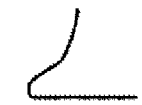 | Locus Screen XY Coordinate Data 03.jpg | | | |
| 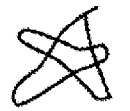 | Locus Screen XY Coordinate Data 05.jpg | | | |
| | | | | |
| | | | | |
| | | | | |
| | | | | |

| 1701 | 1702 | 1703 | 1704 | |
|---|---|---|---|---|
| SPEECH FEATURE DATA | SPEECH VOLUME INFORMATION AND FILE INFORMATION 1 | SPEECH VOLUME INFORMATION AND FILE INFORMATION 2 | SPEECH VOLUME INFORMATION AND FILE INFORMATION 3 | ..... |
| MIKE | SPEECH VOLUME 20db 11.jpg | SPEECH VOLUME 30db 12.jpg | | |
| JOHN | SPEECH VOLUME 20db 14.jpg | | | |
| FLOWER | SPEECH VOLUME 20db 13.jpg | | | |
| SCENERY | SPEECH VOLUME 20db 15.jpg | | | |
| | | | | |
| | | | | |
| | | | | |

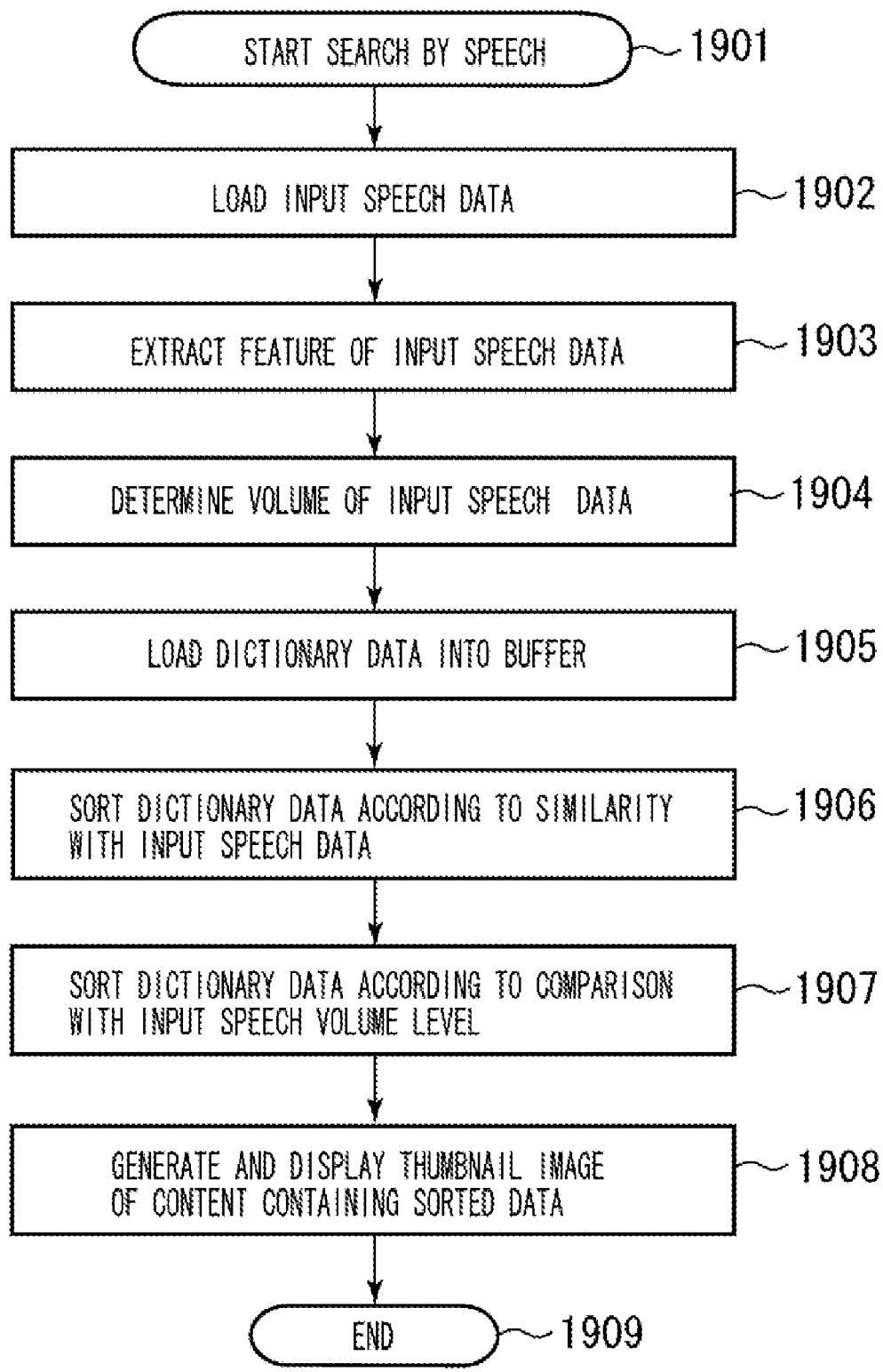

INFORMATION PROCESSING APPARATUS AND CONTROL METHOD

BACKGROUND OF THE INVENTION

1. Field of the Invention

The present invention relates to an information processing apparatus which is capable of searching for content using dictionary data which contains content and an associated locus. More particularly, the present invention relates to an information processing apparatus which is capable of searching for content by a recognized locus.

2. Description of the Related Art

Conventionally, content can be classified according to metadata which is attached to the content in advance. Japanese Patent Application Laid-Open No. 2005-236646 discusses an image display apparatus in which classification is performed according to a feature quantity of a thumbnail that is extracted from thumbnail data of image data under a feature quantity extracting condition.

Further, Japanese Patent Application Laid-Open No. 10-171835 discusses a method in which an information processing apparatus conducts search using a search key that is generated by a search key generation unit using, for example, date and time of creation, input coordinate position, display area, line width, and writing speed. Such data is acquired while a user operates a pen and inputs stroke data. The data is also acquired from a result of that operation.

Furthermore, Japanese Patent Application Laid-Open No. 07-073190 discusses a pen-based computer system in which a pictogram image serving as a file name is used for search.

However, according to the image display apparatus discussed in Japanese Patent Application Laid-Open No. 2005-236646, classification becomes inadequate when the feature quantities are similar. In addition, in most cases, the result of the classification does not turn out as the user expects when the classification is performed based on an image.

Further, the information processing apparatus discussed in Japanese Patent Application Laid-Open No. 10-171835 requires the user to store operation processes, such as input coordinate positions or date and time of creation.

Furthermore, the pen-based computer system discussed in Japanese Patent Application Laid-Open No. 07-073190 requires a certain time for processing since a pictogram image serving as a file name is searched for from all files.

Additionally, in the aforementioned apparatuses and systems, a classification method remains unchanged even when a content volume is increased.

SUMMARY OF THE INVENTION

An embodiment of the present invention is directed to an information processing apparatus facilitating simple classification that reflects user's intention.

According to an aspect of the present invention, an information processing apparatus includes a storage unit configured to store dictionary data in which a locus and one or more pieces of content are registered in association with one another, an input unit configured to input a locus in association with content, a comparison unit configured to compare the locus input by the input unit and a locus registered in the dictionary data, and an addition unit configured to add data to the dictionary data stored in the storage unit based on a comparison result generated by the comparison unit.

According to another aspect of the present invention, an apparatus includes a storage unit configured to store dictionary data in which a speech and one or more pieces of content are registered in association with one another, an input unit configured to input a speech in association with content, a comparison unit configured to compare the speech input by the input unit and a speech registered in the dictionary data, and an addition unit configured to add data to the dictionary data stored in the storage unit based on a comparison result generated by the comparison unit.

According to yet another aspect of the present invention, a method includes storing dictionary data in which a locus and one or more pieces of content are registered in association with one another, inputting a locus in association with content, comparing the input locus and a locus registered in the dictionary data, and adding data to the dictionary data based on a result of the comparison.

According to an exemplary embodiment of the present invention, since a class or type can be added later without key entry or menu selection, classification that reflects user's intention can be simply achieved. Additionally, since classified content is searched for by a recognized input locus with dictionary data, the search can be performed more speedily than when the search is performed on all pieces of content.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating a data structure of a locus classification dictionary according to the first exemplary embodiment of the present invention.

FIG. 17 is a diagram illustrating a data structure of a speech classification dictionary according to the third exemplary embodiment of the present invention.

FIG. 19 is a flowchart illustrating an example of content search processing using a speech according to the third exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
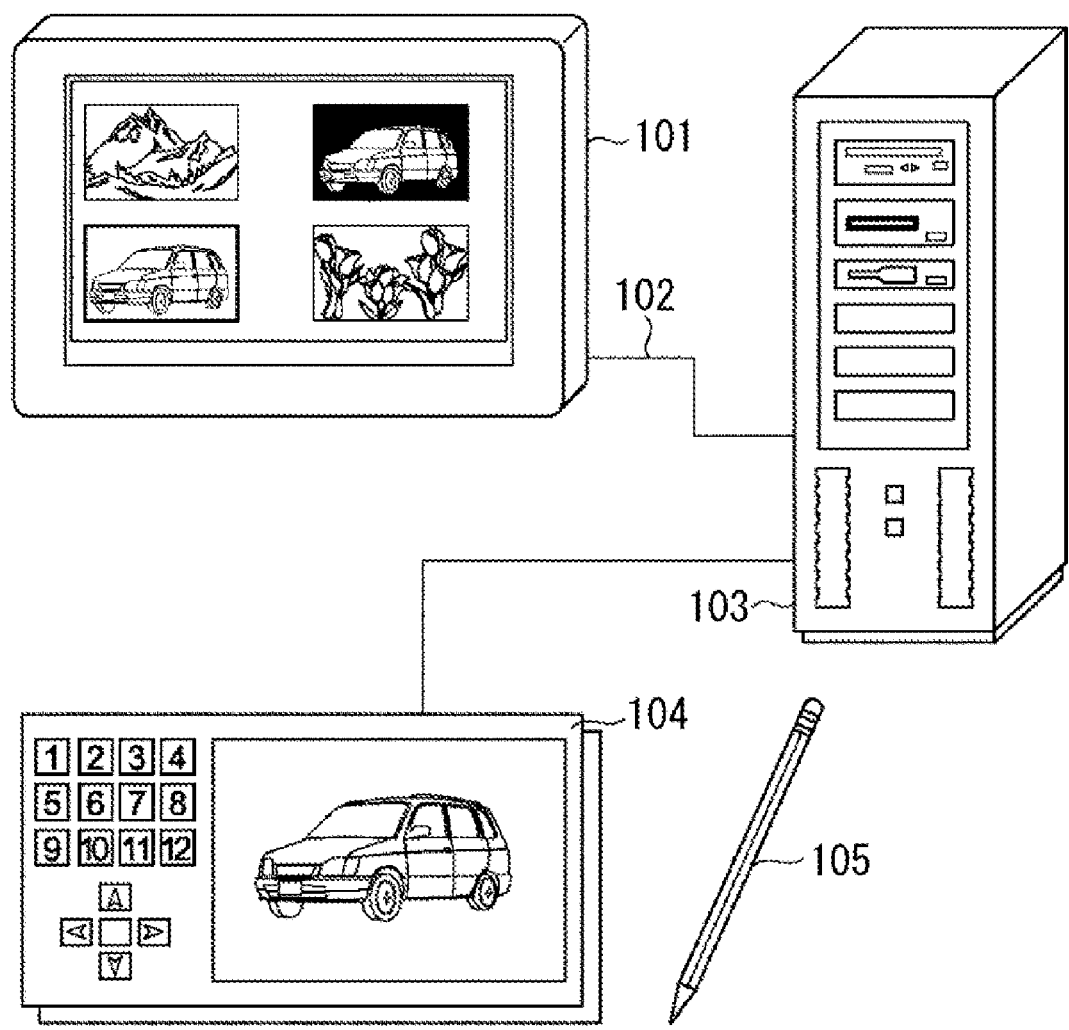
FIG. 1 illustrates a usage configuration of an information processing apparatus according to a first exemplary embodiment of the present invention.

FIG. 1 illustrates a usage configuration of an information processing apparatus 104 according to a first exemplary embodiment of the present invention. A digital TV 101 includes a liquid crystal display unit, a central processing unit (CPU), a read-only memory (ROM), a random access memory (RAM), a hard disk drive (HDD), an insert slot for a recording medium, and a network interface unit used for connection to a personal computer which can be connected to a network. Further, the digital TV 101 includes built-in software used for reproducing and displaying content data including still or moving images on a different network.

A local area network 102 is used for connection to a storage apparatus configured to store still or moving images, such as a hard disk recorder. A media server 103 is connected to the information processing apparatus 104 via the local area network 102. Still or moving images are stored in the media server 103. According to a request sent via the local area network 102, the media server 103 delivers data, such as a still image, via the local area network 102.

The information processing apparatus 104 includes a liquid crystal display unit, a digitizer, such as a transparent resistive digitizer, set on the liquid crystal display, a CPU, a memory, a wireless Local Area Network (LAN) chip, etc. A pen 105 can be used for the digitizer. A user can use the pen 105 to add a locus to a still image displayed on the liquid crystal display unit.

Figure 2:
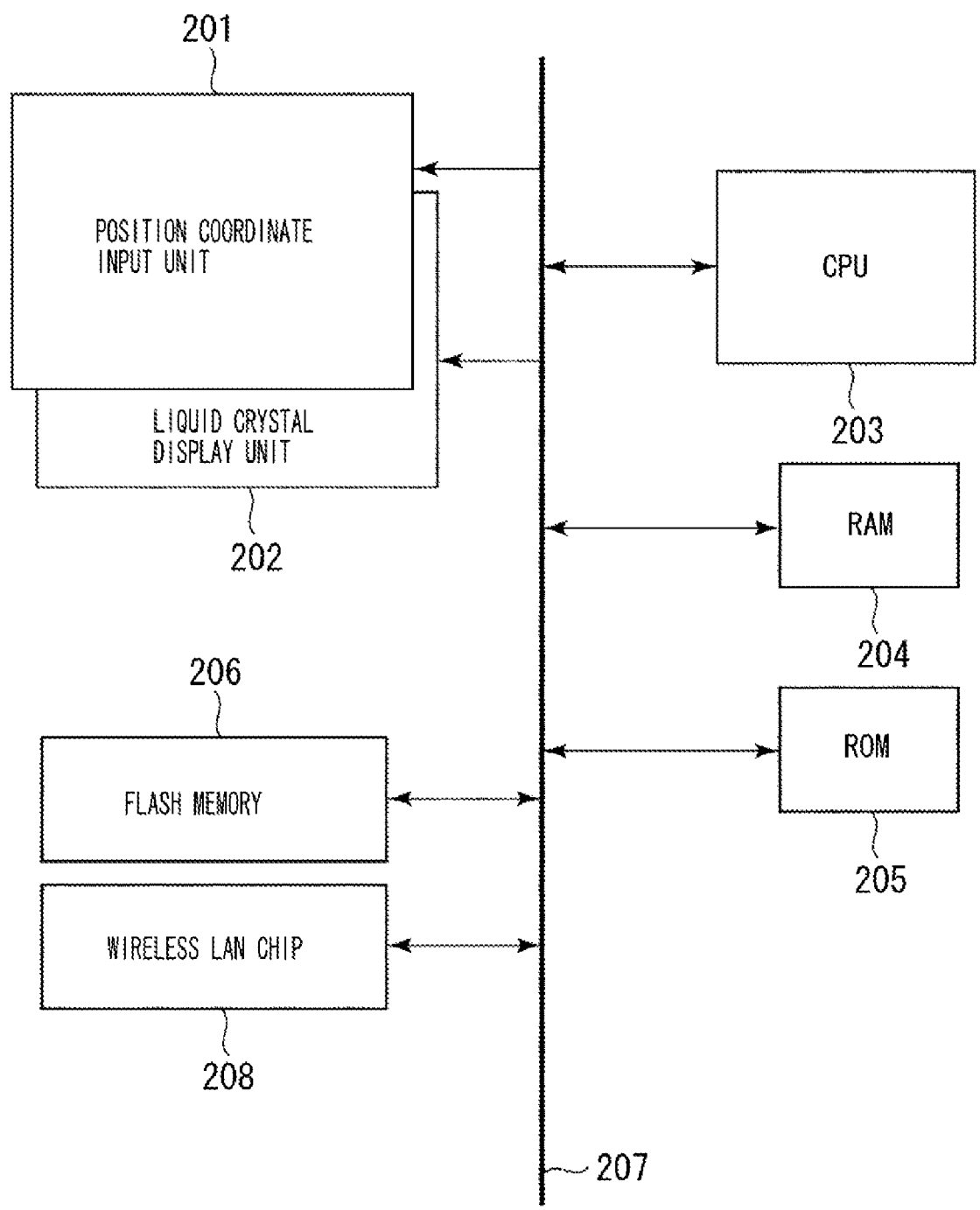
FIG. 2 illustrates a block diagram of the information processing apparatus according to the first exemplary embodiment of the present invention.

FIG. 2 illustrates a block diagram of the information processing apparatus 104 according to the present exemplary embodiment. A position coordinate input unit 201 includes a transparent resistive digitizer. When the surface of the position coordinate input unit 201 is pressed by a pen for instance, XY coordinate data of the position that has been pressed is sent to a CPU 203 via a system bus 207.

A liquid crystal display unit 202 includes a liquid crystal display element, a liquid crystal control circuit, and a display memory. The liquid crystal display unit 202 is connected to the CPU 203 via the system bus 207. The liquid crystal display unit 202 can display an image according to an instruction from the CPU 203. The CPU 203 is connected to a RAM 204, a ROM 205, the liquid crystal display unit 202, etc., via the system bus 207. The CPU 203 executes processing according to a program stored in the ROM 205. Processing of flowcharts described below is executed by the CPU 203.

The RAM 204 is used as a work area. The ROM 205 stores a procedure of locus generation for content classification. A flash memory 206 can be used for a common information apparatus. Since the flash memory 206 is connected to the CPU 203 via the system bus 207, a local content file including still or moving images and setting information are stored in the flash memory 206.

The system bus 207 is used for transmitting and receiving data between the CPU 203, the ROM 205, the RAM 204, and other devices. A wireless local area network (LAN) chip 208 enables communication with a different personal computer. It is to be noted that although a still image is used as an example of content in exemplary embodiments, a moving image, sound, text, a thumbnail, or a folder can also be used as content.

Figure 3:
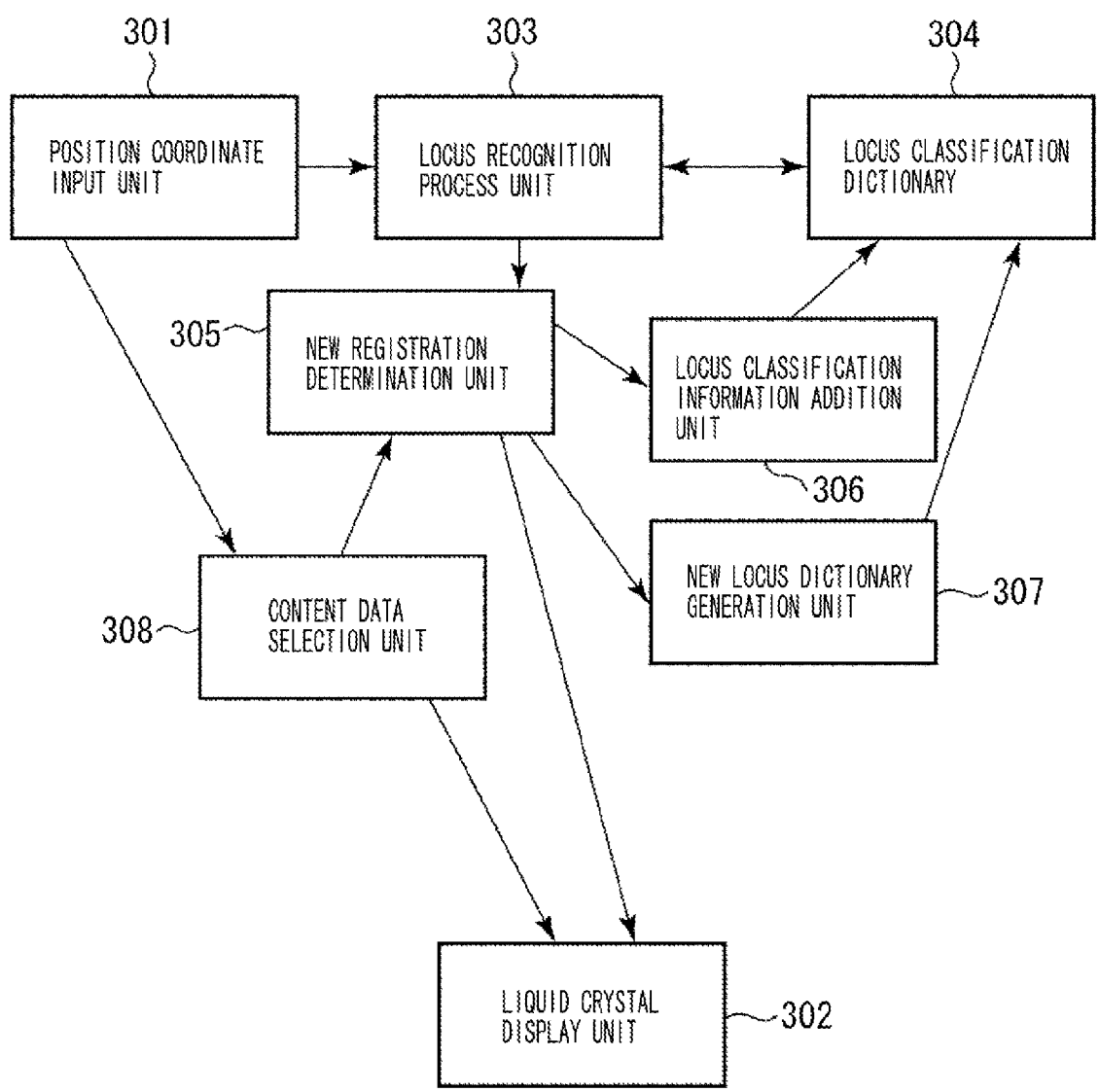
FIG. 3 is a diagram illustrating a configuration of the information processing apparatus according to the first exemplary embodiment of the present invention.

FIG. 3 is a diagram illustrating a configuration of the information processing apparatus 104 according to the present exemplary embodiment. A position coordinate input unit 301 includes a transparent resistive digitizer. The position coordinate input unit 301 detects position coordinate data of a locus input by a pen and sends the position coordinate data to the CPU 203 in FIG. 2. The CPU 203 processes the position coordinate data and stores the processed data in a particular area of the RAM 204 in FIG. 2. A locus recognition process unit 303 compares a shape feature of locus data sent from the position coordinate input unit 301 with locus feature data registered in a locus classification dictionary 304 and outputs candidate dictionary data and a degree of similarity corresponding to a result of the comparison.

The locus classification dictionary 304 contains feature data of a locus and file information of locus-written content. A new registration determination unit 305 determines whether to newly register an input locus or to add information to the existing dictionary data according to a recognition result provided by the locus recognition process unit 303. A locus classification information addition unit 306 adds file information of the current content and position information of the input locus to the existing locus classification dictionary data.

A new locus dictionary generation unit 307 adds feature data of the input locus to the locus classification dictionary 304 as dictionary data. A content data selection unit 308 selects a file which contains content and generates an instruction to display the file on the screen of a liquid crystal display unit 302. The liquid crystal display unit 302 displays content selected by the content data selection unit 308 and also displays the input locus.

Figure 4:
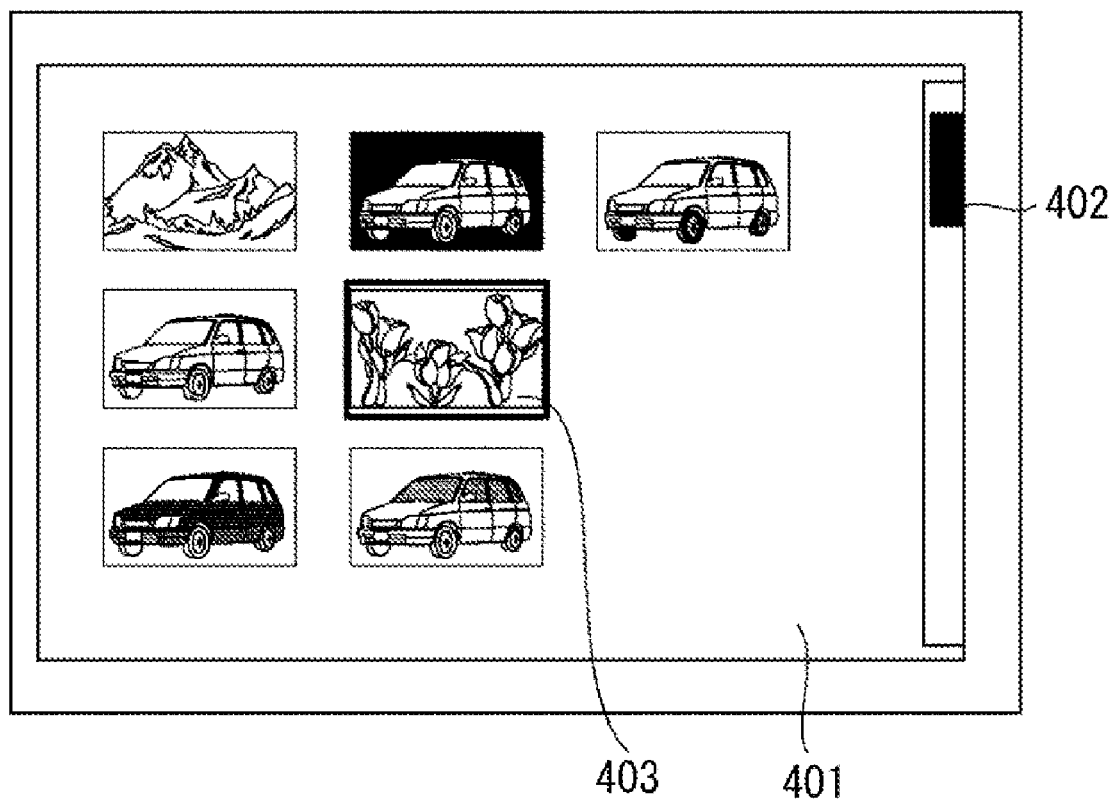
FIG. 4 illustrates an example of a content selection screen displayed by the information processing apparatus according to the first exemplary embodiment of the present invention.

FIG. 4 illustrates an example of a content selection screen displayed by the information processing unit. The content selection screen includes a display area 401 to display a list of content. A scroll bar 402 can be used for scrolling the screen. The user can operate the scroll bar 402 via the position coordinate input unit 301 to scroll the screen. In the example screen illustrated in FIG. 4, content 403 is the selected content. If the user inputs a command causing content to be selected, the information processing unit displays the selected content in a full-screen mode.

Figure 5:
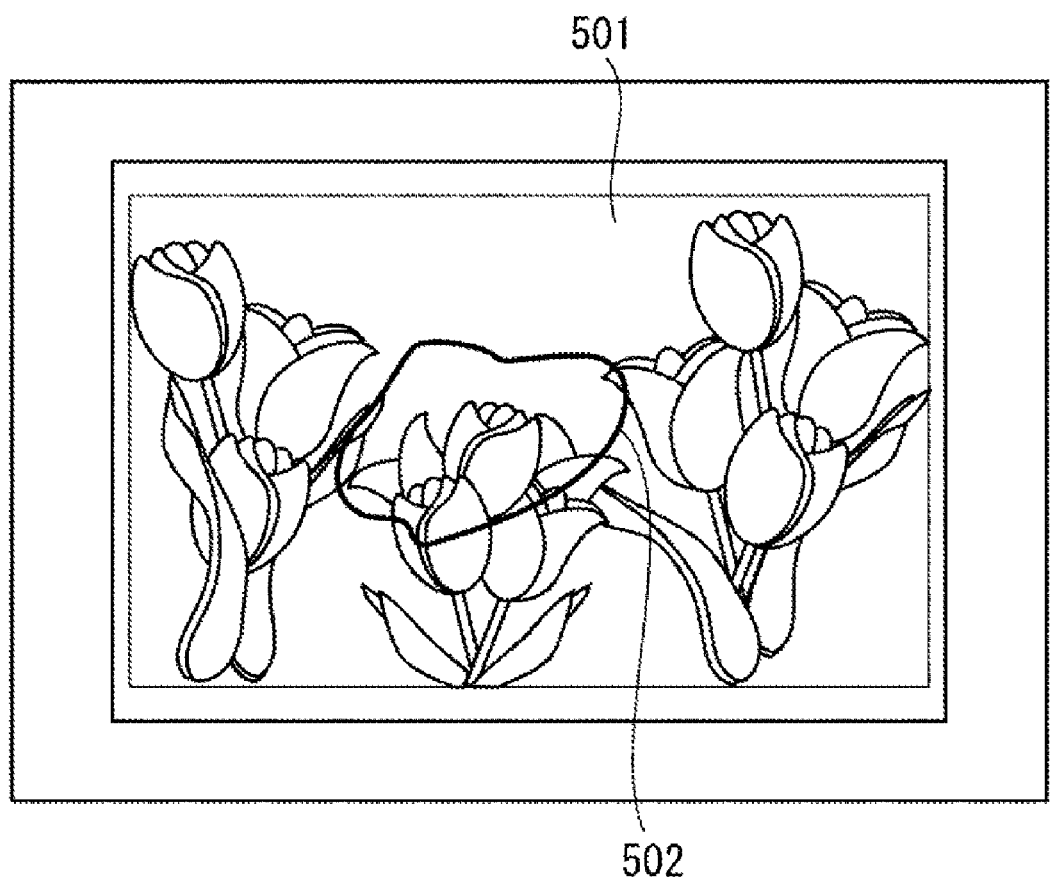
FIG. 5 illustrates an example of full-screen display of selected content displayed by the information processing apparatus according to the first exemplary embodiment of the present invention.

FIG. 5 illustrates an example of full-screen display of selected content 501 displayed by the information processing unit. A locus 502 is written (drawn) on the content 501. The user can freely write a locus on content via the pen 105 in FIG. 1. Since the written locus is different from content data, the user can freely display or hide the written locus.

FIG. 6 is a diagram illustrating a data structure of the locus classification dictionary 304 according to the present exemplary embodiment. Dictionary data of each locus contains locus feature data 601, a plurality pieces of locus screen position information and file information 602 to 604.

For example, the locus classification dictionary 304 includes locus feature data of a locus 605 representing "○", coordinate data of an input position of the locus in a file "01.jpg" on which "○" is written (drawn), and coordinate data of an input position of the locus in a file "02.jpg" on which "○" is written. If only one file exists for certain feature data, only one piece of locus screen position information and file information is listed. As illustrated in the row of locus feature data "Δ", coordinate data of an input position of the locus in a file "04.jpg" on which "Δ" is written is registered. As is apparent from the data structure of the locus classification dictionary 304, a locus of an arbitrary shape that is input by the user is stored in the locus classification dictionary 304.

Figure 7:
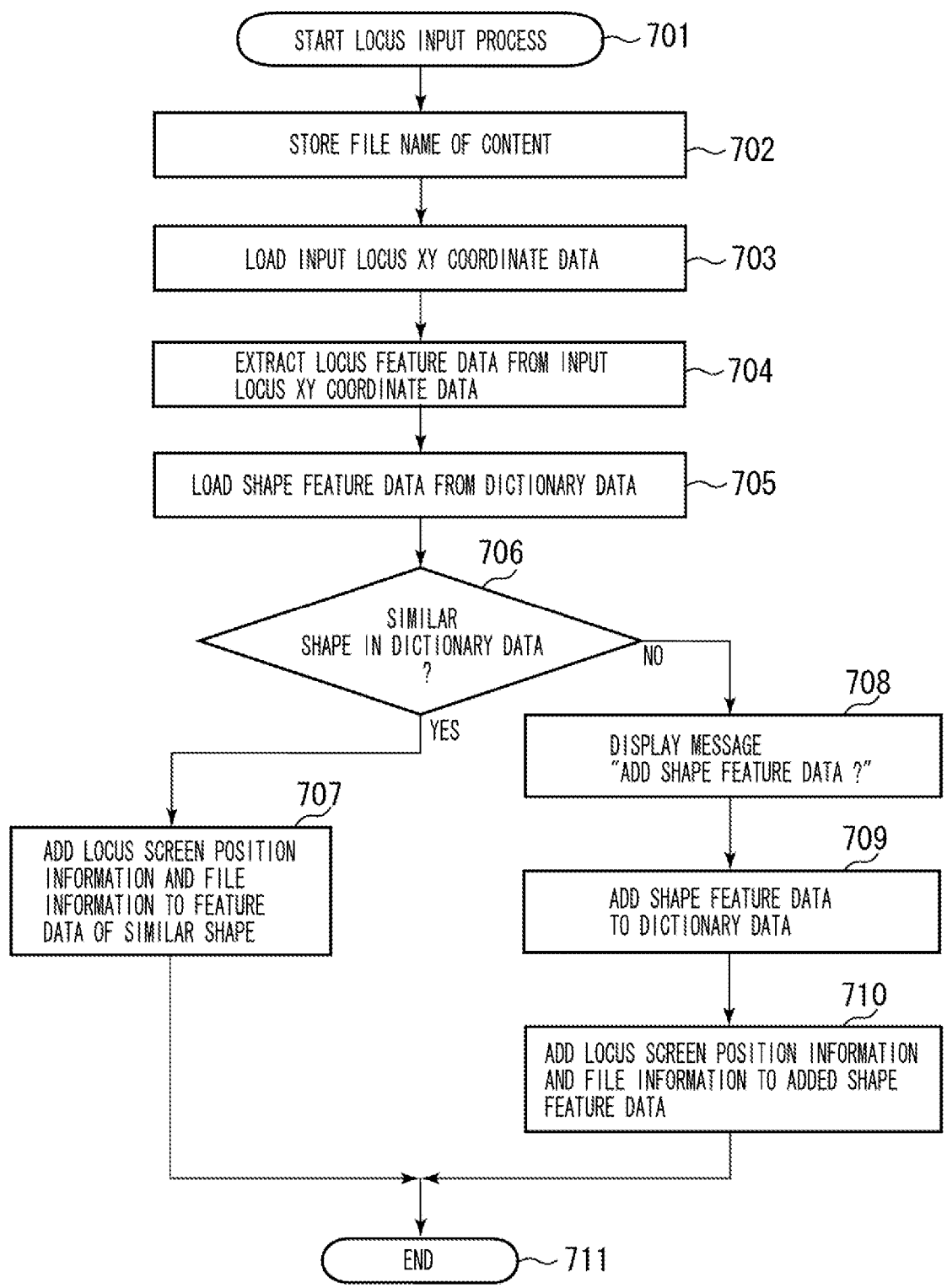
FIG. 7 is a flowchart illustrating an example of processing for a locus input to content according to the first exemplary embodiment of the present invention.

FIG. 7 is a flowchart illustrating an example of locus input processing for content. The locus input processing starts when an input locus is drawn on content and the addition of the input locus is requested by a user. For example, the process starts when the user adds a locus via the pen 105 and presses an enter key (not illustrated).

In step 701, the CPU 203 starts a process of inputting a locus to content. A storage buffer for the dictionary data is initialized. In step 702, the CPU 203 stores a file name of content that is currently displayed. For example, in the case illustrated in FIG. 5, the CPU 203 stores the file name of a photograph of flowers (06.jpg). In an embodiment, the file is a local file. However, if the file is on a network, for example, the CPU 203 stores a file name on the network (e.g., ¥¥net.com¥¥video¥06.jpg).

In step 703, the CPU 203 stores a data string of XY coordinate data of the locus added to the content on the screen into a work buffer. In step 704, the CPU 203 extracts feature data of the locus from the stored XY coordinate data string. This extraction can be performed using a conventional locus recognition algorithm. Since the user's own handwriting is registered and the user himself uses the handwriting, a high recognition rate can be expected. The input locus is, for example, normalized into 256*256, one stroke of locus is divided into twenty parts and, for example, a position coordinate of each divided part is stored.

In step 705, the CPU 203 loads shape feature data in the dictionary data into the buffer. For example, in FIG. 6, the locus feature data 601, which includes loci "○", "Δ", "∠", and "☆", is loaded. In step 706, the CPU 203 determines whether a shape similar to the feature data of the input data exists in the dictionary data. If dictionary data of a similar shape exists (YES in step 706), the process proceeds to step 707. If dictionary data of a similar shape does not exist (NO in step 706), the process proceeds to step 708. This determination is made by matching the feature data of the input data with the feature data in the dictionary data and extracting a difference between the feature data. If the difference between the feature data of the input data and the feature data of dictionary data having the smallest difference (the most similar dictionary data) is close to "0", the CPU 203 determines that the dictionary data of a similar shape exists. If the difference between the feature data of the input data and the feature data of each of the dictionary data is greater than or equal to a given threshold value, the CPU 203 determines that the dictionary data of a similar shape does not exist.

In step 707, the CPU 203 adds locus screen position information and file information to the feature data of the similar shape in the dictionary data. For example, as for the locus 502 in FIG. 5, since the locus 501 is a shape that resembles "○", the locus 502 is determined to match the shape 605 ("○") in the dictionary data illustrated in FIG. 6. Thus, a file name "06.jpg" and maximum and minimum XY coordinate data of a circumscribed rectangle of the input locus are added to the dictionary data in a column next to the file "02.jpg".

In step 708, the CPU 203 displays a message asking the user whether to add the feature data to the dictionary data. This message is displayed on the screen to prevent the user from registering an unsuccessfully input locus. The message is, for example, "Register new locus? Press "OK" for YES, or "CANCEL" for NO.". Besides, the message can be set by the system setting so as not to be displayed further.

In step 709, the CPU 203 adds the shape feature data to the dictionary data. The CPU 203 adds the shape feature data extracted in step 704 to the locus classification dictionary 304 in FIG. 3. For example, if the dictionary data is the one such as illustrated in FIG. 6, the feature data is added below the shape data of "☆" which is listed at the end of the dictionary data. The added data will then be the end of the dictionary data.

In step 710, the CPU 203 adds locus screen position information and file information to the dictionary data which is added in step 709. For example, if a locus of shape "3" is added to the photograph of flowers "06.jpg" in FIG. 5, shape feature data of "3" is registered below the shape feature data of "☆". Then, the file name "06.jpg" and maximum and minimum XY coordinate data of a circumscribed rectangle of the input locus are registered. In step 711, the CPU 203 ends the locus input processing for content.

Figure 8:
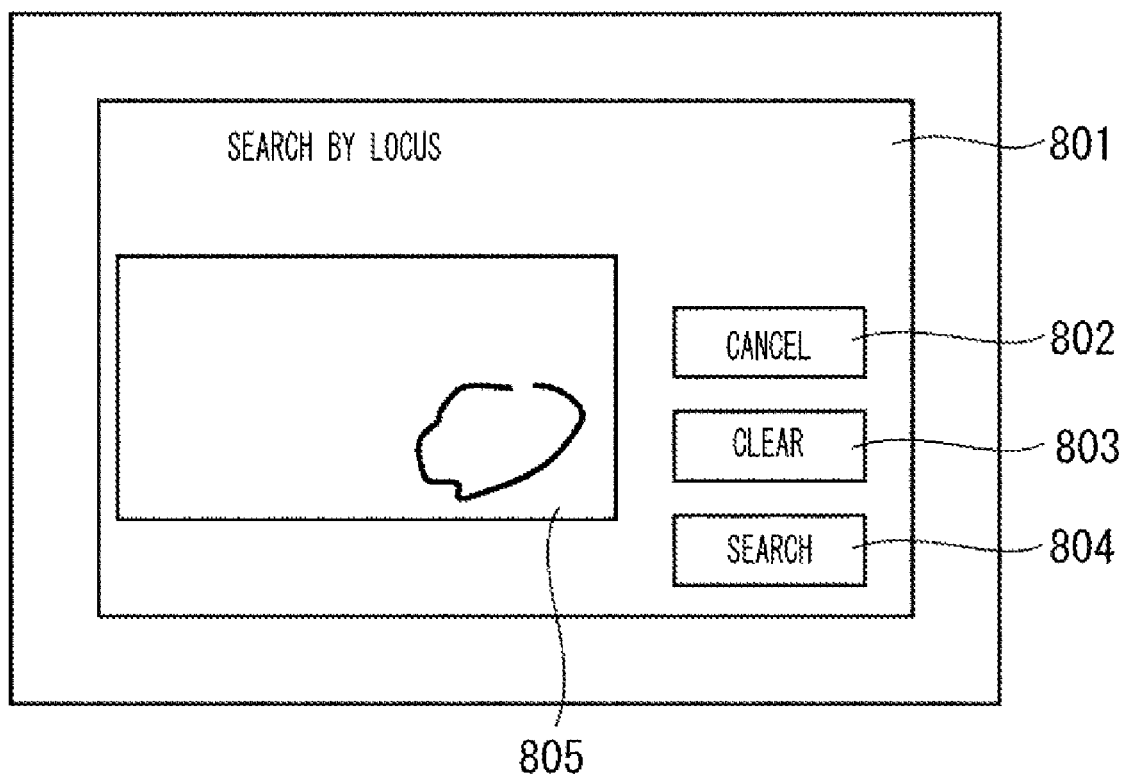
FIG. 8 illustrates an example of a locus input screen at the time of search displayed by the information processing apparatus according to the first exemplary embodiment of the present invention.
Figure 9:
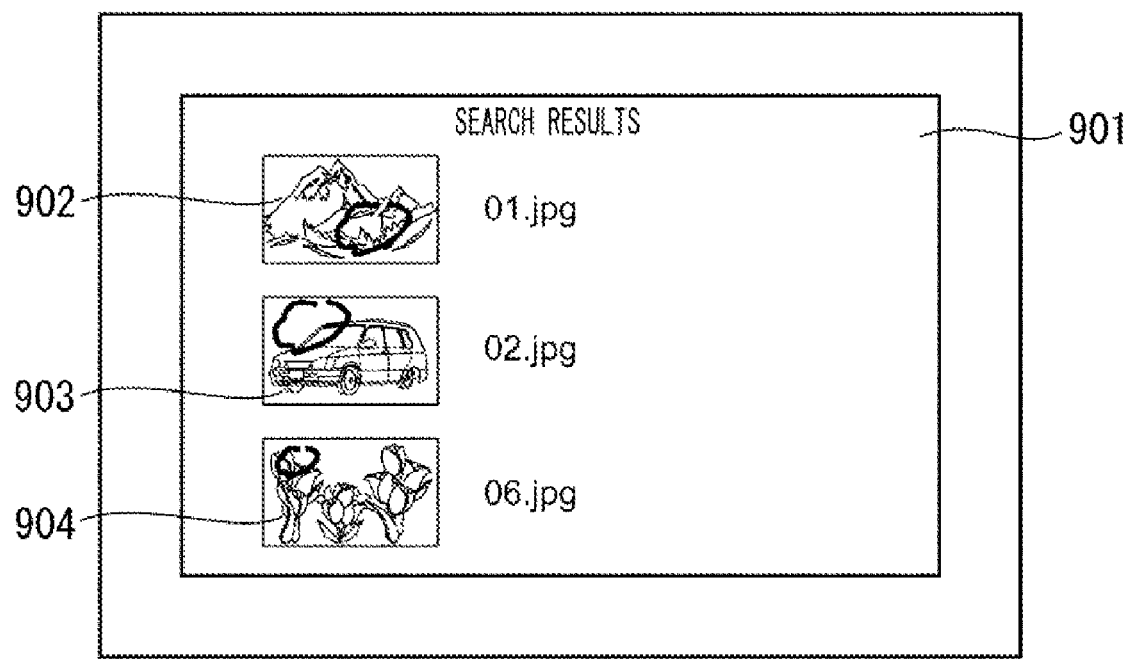
FIG. 9 illustrates an example of a search result display screen displayed by the information processing apparatus according to the first exemplary embodiment of the present invention.

FIG. 8 illustrates an example of a locus input screen at the time of search displayed by the information processing apparatus. FIG. 9 illustrates an example of a search result display screen 901 displayed by the information processing apparatus. A window 801 in FIG. 8 is a locus input window at the time of search. If a CANCEL key 802 is pressed, the search process is canceled. If a CLEAR key 803 is pressed, a locus displayed on a locus input area 805 is deleted. If a SEARCH key 804 is pressed, the search is started based on a locus displayed on the locus input area 805. When the SEARCH key 804 is pressed, the processing of the flowchart in FIG. 10 is started.

Figure 10:
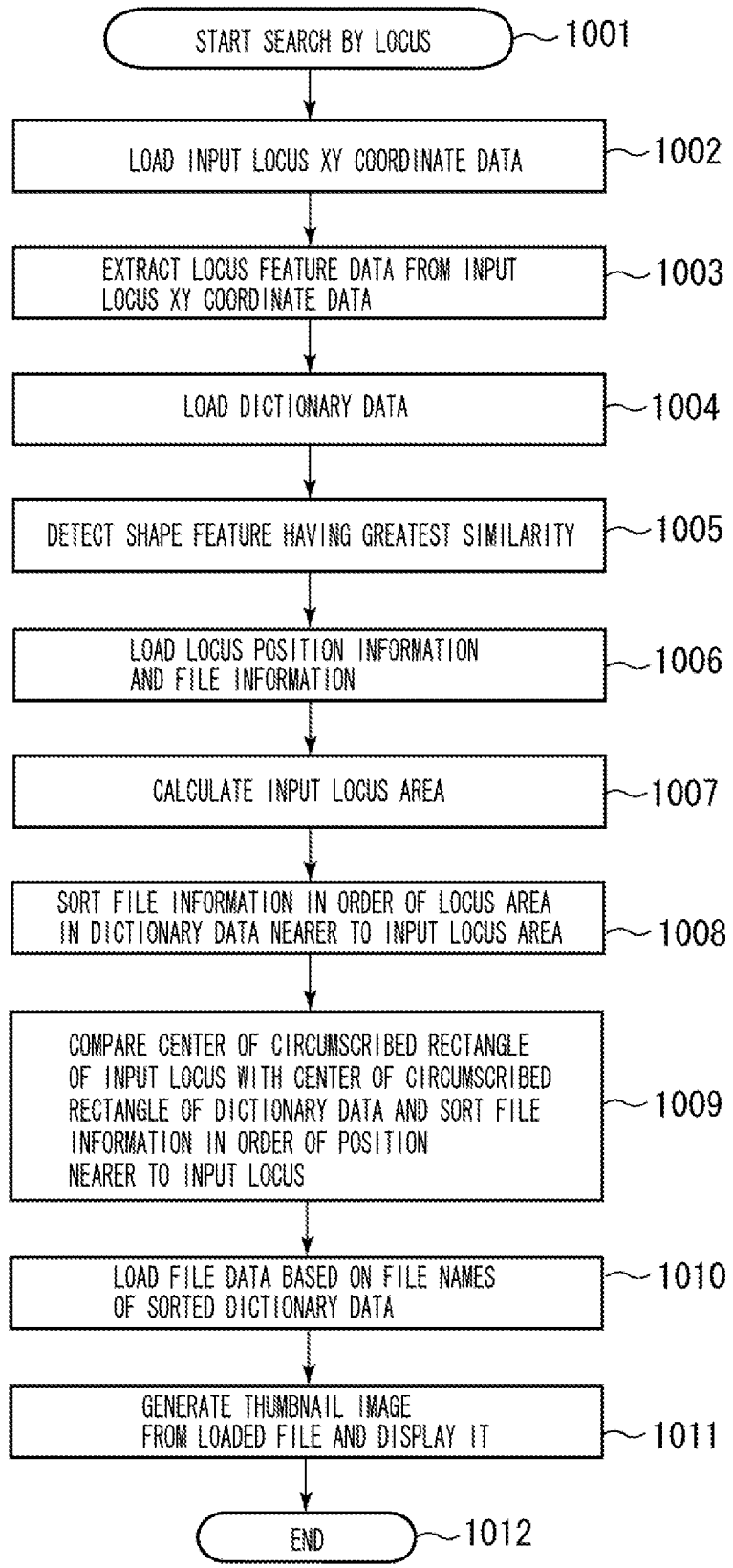
FIG. 10 is a flowchart illustrating a search process using a locus according to the first exemplary embodiment of the present invention.

FIG. 10 is a flowchart illustrating an example of search processing using a locus. In step 1001, the CPU 203 starts the search process using a locus and performs allocation and initialization of a buffer. In step 1002, the CPU 203 loads XY coordinate data of the input locus. The locus data of the locus input in the locus input area 805 in FIG. 8 is loaded into the buffer. In step 1003, the CPU 203 extracts shape feature data from the loaded locus data. The XY coordinate value of the locus data is normalized into 256*256. Then, one stroke of locus is divided into twenty parts, and a position coordinate of each divided part is stored as a data string.

In step 1004, the CPU 203 loads the dictionary data into the work buffer. For example, the locus feature data 601 ("○", "Δ", "∠", "☆") illustrated in FIG. 6 is loaded into the work buffer.

In step 1005, the CPU 203 detects a shape feature that is most similar to the input locus. The CPU 203 compares the XY coordinate data of the feature data extracted from the input locus data with the XY coordinate data in the dictionary data and then calculates the difference in distance. The dictionary data having the smallest difference is regarded as most similar to the input locus data. If the input data is "○", such as the shape input in the locus input area 805 in FIG. 8, the locus 605 ("○") is determined to be the dictionary data most similar to the input locus data.

In step 1006, the CPU 203 loads the locus screen XY coordinate information and file information of the detected shape feature into the buffer. In the case illustrated in FIG. 6, for example, coordinate data of a locus input position in a file "01.jpg" containing "○" and coordinate data of a locus input position in a file "02.jpg" containing "○" are loaded.

In step 1007, the CPU 203 calculates an area S of the circumscribed rectangle of the input locus by the following equation.

$$S = dx * dy (x\max - x\min = dx, y\max - y\min = dy)$$

In step 1008, the CPU 203 sorts the file information in the dictionary data in order of the locus area nearer to the area S, which is an area of the circumscribed rectangle of the input locus. For example, the areas are classified into three sizes, large, medium, and small. If the locus area of the input locus is large, the file information is sorted in order of large area to small area.

In a case where the dictionary data has data items having equal area size, in step 1009, the CPU 203 compares the center of a circumscribed rectangle of the input locus and the center of a circumscribed rectangle of the locus of each data item in the dictionary data having equal area size. The CPU 203 then sorts the file information in order of position nearer to the input locus. For example, if the locus is input at the top-left corner of the screen and the loci in the dictionary data are positioned at the center, the bottom right corner, and the top-left corner of the screen, the file information is sorted in order of top-left corner, center, to bottom right corner.

In step 1010, the CPU 203 loads the file data based on the file names of the sorted dictionary data. For example, if the sorted files are files 01.jpg, 02.jpg, and 06.jpg, which are illustrated in FIG. 9, then the CPU 203 loads the file data of those files.

In step 1011, the CPU 203 generates a thumbnail image based on the loaded file and displays the thumbnail. For example, if the loaded files are the files 01.jpg, 02.jpg, and 06.jpg, thumbnail images are generated from those files and displayed in order of a thumbnail 902 (01.jpg), a thumbnail 903 (02.jpg), and a thumbnail 904 (06.jpg) as illustrated in FIG. 9. A locus is displayed with each thumbnail image. In step 1012, the process ends.

According to the above-described processing, the information processing apparatus can classify content data, such as still images, using an arbitrary type of locus having an arbitrary shape. In this way, since a class or type can be added later without key entry or menu selection, classification that reflects user's intention can be simply achieved. Additionally, since classified content is searched for by a recognized input locus with dictionary data, the search can be performed more speedily than when the search is performed on all pieces of content.

Second Exemplary Embodiment

According to the first exemplary embodiment, the input locus data and the dictionary data have one threshold value as a determination criterion. Thus, the user has to alternatively choose whether to newly register or to add data to the existing locus dictionary. However, the shape of the locus registered in the dictionary data may be unclear depending on the user's handwriting. In this case, the input locus data and the dictionary data may not match well. In order to prevent such a problem, according to an exemplary embodiment, two threshold values are determined as a determination criterion. If the degree of matching is less than "1" of the threshold value, new data is added to the existing locus dictionary data. If the degree of matching is "1" or greater but less than "2", data of a similar shape is added to the existing shape data. Since a usage configuration and a block diagram of the information processing apparatus of the present exemplary embodiment is similar to those of the first exemplary embodiment illustrated in FIGS. 1 and 2, a description thereof will not be repeated.

Figure 11:
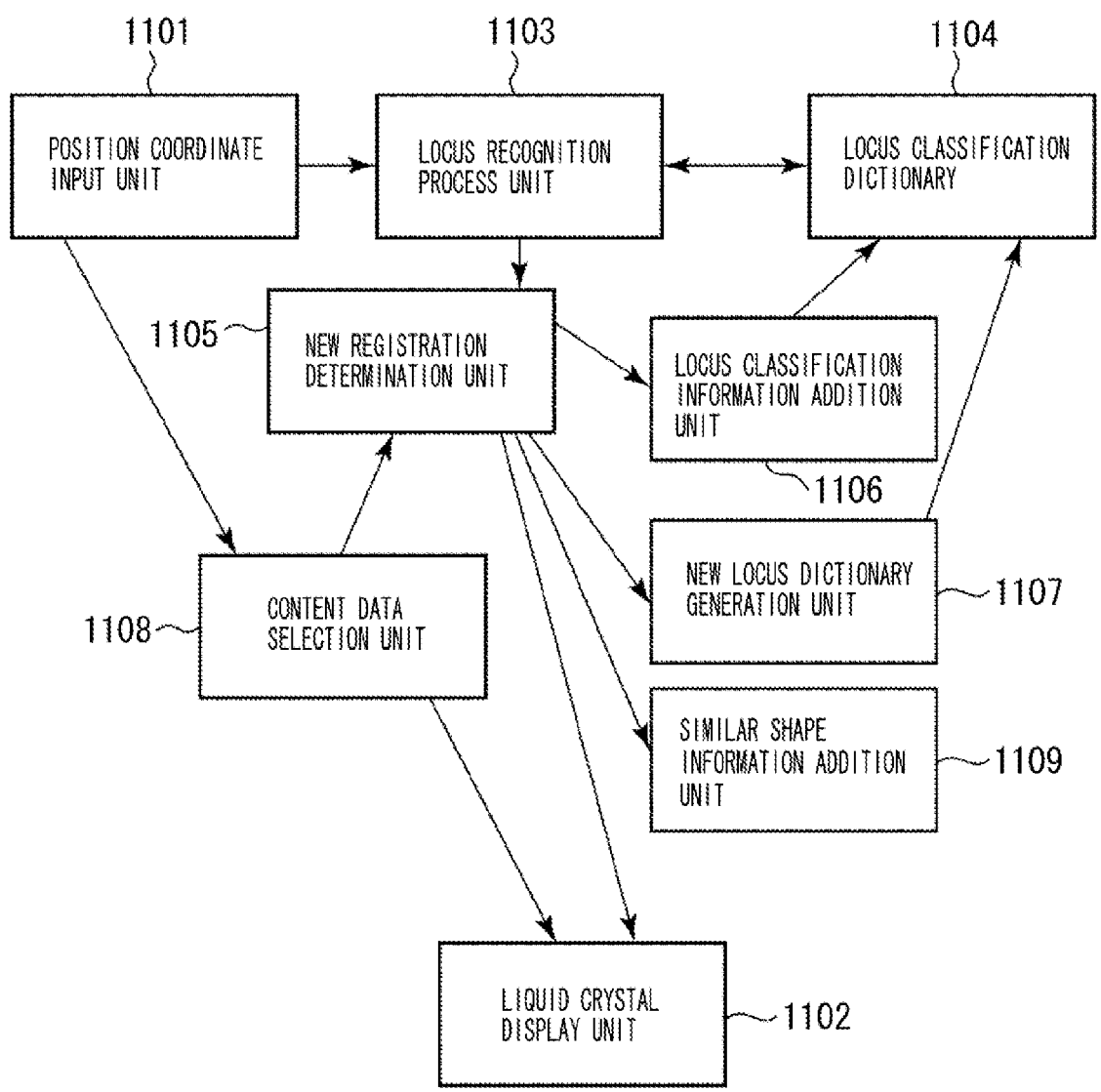
FIG. 11 is a diagram illustrating a configuration of an information processing apparatus according to a second exemplary embodiment of the present invention.

FIG. 11 illustrates a configuration of an information processing apparatus 104 according to a second exemplary embodiment of the present invention. Since units 1101 to 1108 are similar in function to the units 301 to 308 of the first exemplary embodiment illustrated in FIG. 3, a description thereof will not be repeated. A similar shape information addition unit 1109 is configured to add different data of a shape similar to the existing shape.

Figure 12:
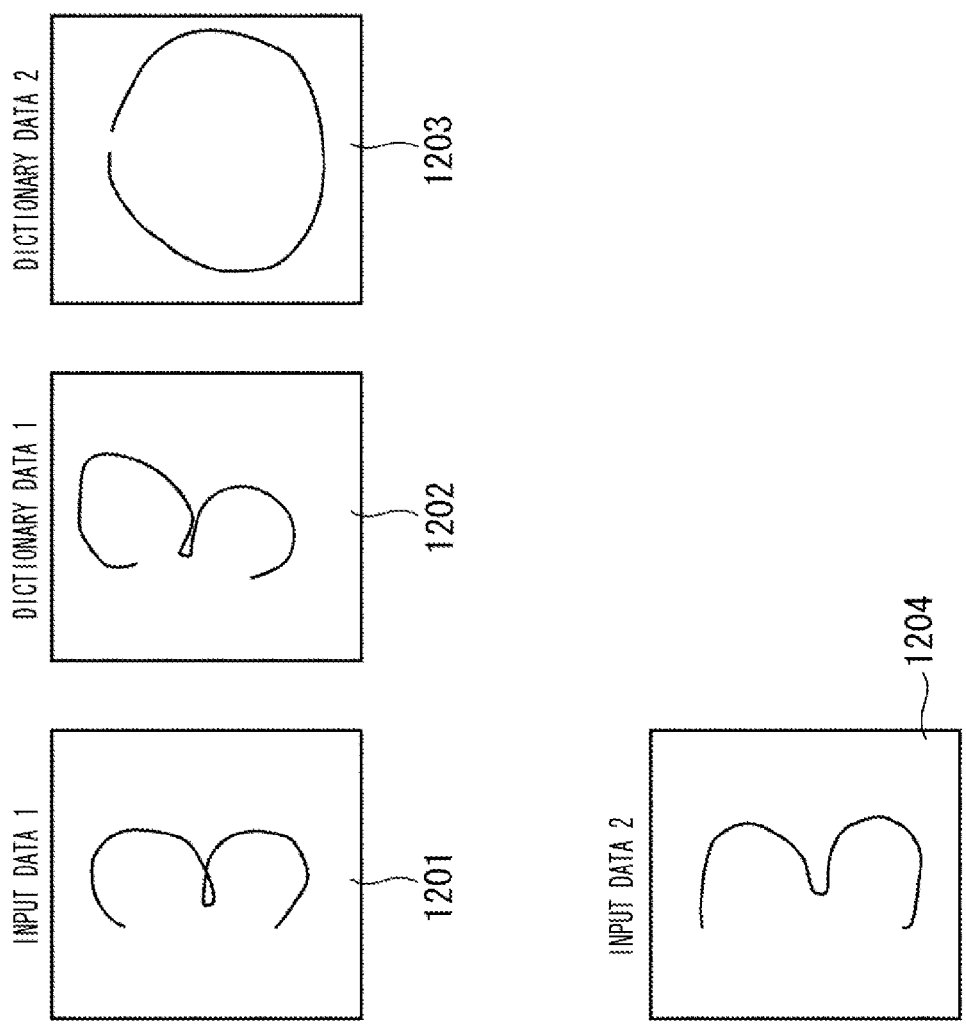
FIG. 12 illustrates an example of a shape of an input locus and a shape of a dictionary locus according to the second exemplary embodiment of the present invention.

FIG. 12 illustrates an example of a shape of an input locus and a shape of a locus in the dictionary data. Loci 1201 and 1204 are examples of input locus data. Loci 1202 and 1203 are examples of locus data in the dictionary data.

Figure 13:
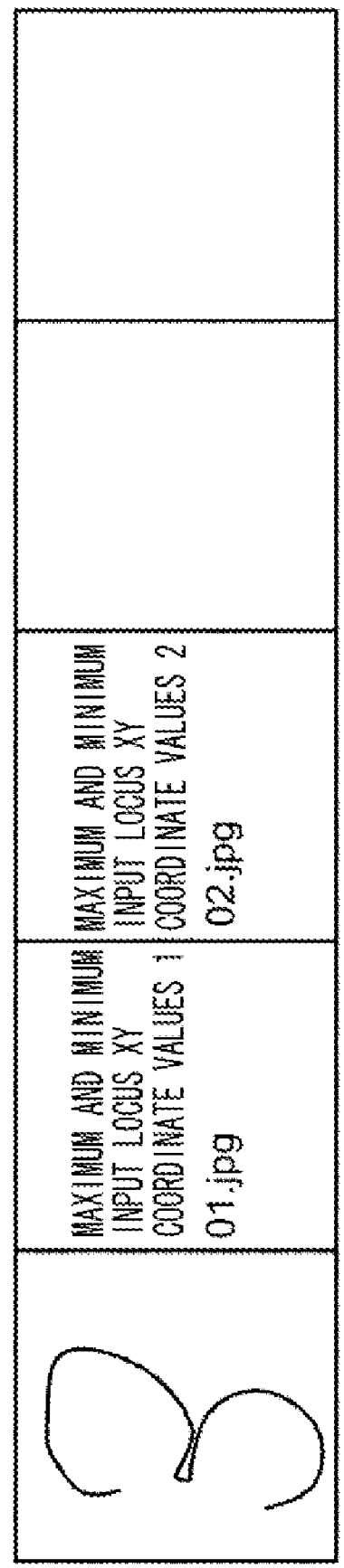
FIG. 13 illustrates an example of dictionary data according to the second exemplary embodiment of the present invention.
Figure 14:
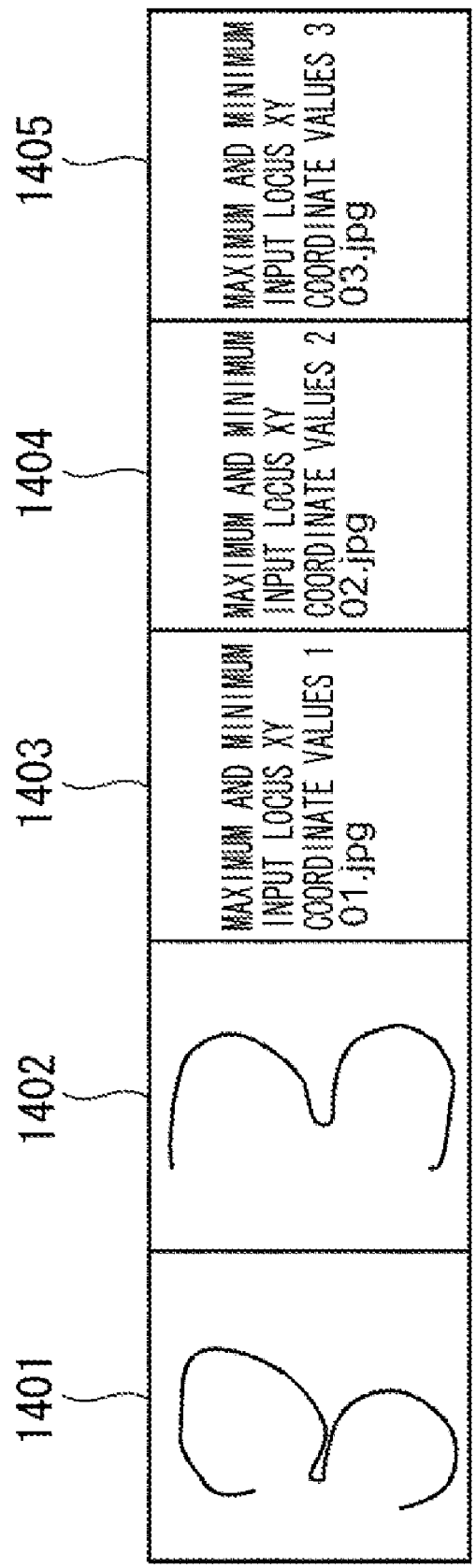
FIG. 14 illustrates an example of dictionary data with additional data according to the second exemplary embodiment of the present invention.

FIG. 13 illustrates an example of the dictionary data. FIG. 14 illustrates an example of the dictionary data with one locus shape data added to the dictionary data illustrated in FIG. 13.

Figure 15:
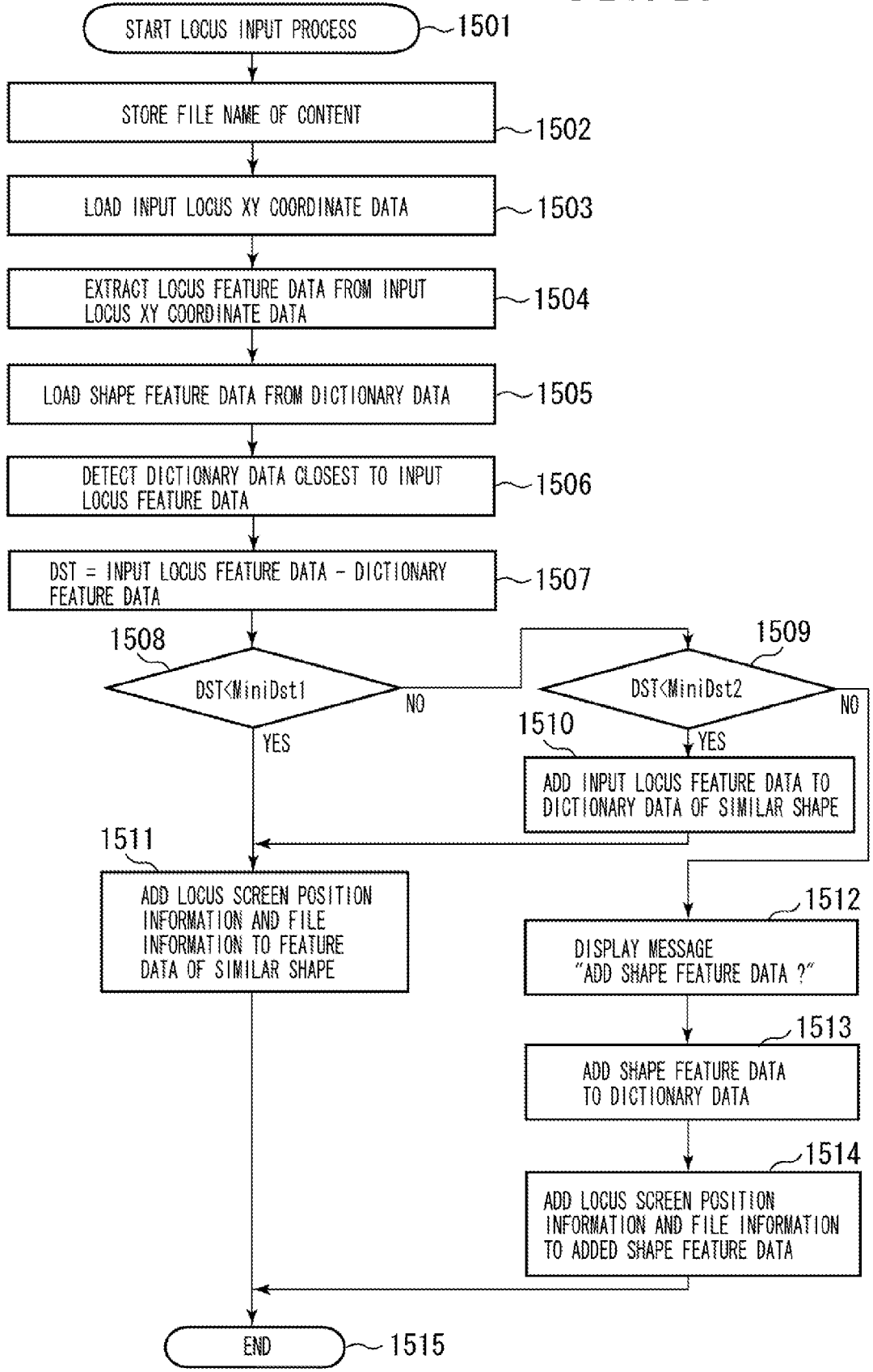
FIG. 15 is a flowchart illustrating an example of processing for a locus input to content according to the second exemplary embodiment of the present invention.

FIG. 15 is a flowchart illustrating an example of locus input processing according to the present exemplary embodiment.

The processing of steps 1501 to 1505, 1511, and 1512 to 1514 in FIG. 15 is similar to the processing of steps 701 to 705, 707, and 708 to 710 in FIG. 7 of the first exemplary embodiment, respectively. Thus, a description thereof will not be repeated.

In step 1506, the CPU 203 detects dictionary data whose feature data is closest to the feature data of the input locus. For example, the CPU 203 compares "dictionary data 1" 1202 and "input data 1" 1201 in FIG. 12. The CPU 203 calculates a degree of difference between them by adding together distance differences of corresponding feature points of the normalized loci. Then, the CPU 203 stores the calculated degree of difference. Next, the CPU 203 compares "dictionary data 2" 1203 and "input data 1" 1201. Then, the CPU 203 calculates and stores the degree of difference between them. Further, the CPU 203 compares the degree of difference of the "dictionary data 1" 1202 and the degree of difference of the "dictionary data 2" 1203 and determines the dictionary data that is closest to the feature data of the input locus. The dictionary data whose degree of difference is less than the other is the dictionary data that is closest to the feature data of the input locus.

In step 1507, the CPU 203 determines a degree of difference DST of the dictionary data closest to the feature data of the input locus.

In step 1508, the CPU 203 compares the degree of difference DST determined in step 1507 and the threshold value "1" (MiniDst1). If the degree of difference DST is less than the threshold value "1" (YES in step 1508), the process proceeds to step 1511. If the degree of difference DST is equal to or greater than the threshold value "1" (NO in step 1508), the process proceeds to step 1509. If the feature data of the input locus and the feature data of the dictionary data are similar as is with the "input data 1" 1201 and the "dictionary data 1" 1202 in FIG. 12, the degree of difference DST is less than the threshold value "1" and the process in step 1511 is applied.

In step 1509, the CPU 203 compares the degree of difference DST determined in step 1507 with a threshold value "2"

(MiniDst2). If the degree of difference DST is less than the threshold value "2" (YES in step 1509), the process proceeds to step 1510. If the degree of difference DST is equal to or greater than the threshold value "2" (NO in step 1509), the process proceeds to step 1512. For example, the degree of difference between the "input data 2" 1204 and the "dictionary data 1" 1202 is greater than the degree of difference between the "input data 1" 1201 and the "dictionary data 1" 1202. In this case, the degree of difference DST is equal to or greater than the threshold value "1" but less than the threshold value "2". Accordingly, the process in step 1510 is applied.

In step 1510, the CPU 203 adds the input shape feature data to the matched dictionary data. This process will be described with reference to FIGS. 12 to 14. Before the input shape feature data is added, the dictionary data includes one shape data, coordinate data of the locus input position in a file "01.jpg" containing "3", and coordinate data of the locus input position in a file "02.jpg" containing "3", as illustrated in FIG. 13.

A locus of the "input data 2" 1204 in FIG. 12 is input as input data. The degree of difference between the "input data 2" 1204 and the "dictionary data 1" 1202 is equal to or greater than the threshold value "1" but less than the threshold value "2". Then, the input shape feature data of the "input data 2" 1204 is added to the end of the shape data of the "dictionary data 1" 1202. FIG. 14 illustrates dictionary data with the additional data. The dictionary data illustrated in FIG. 14 includes shape feature data 1401 of the "dictionary data 1" 1201, shape feature data 1402 generated from the "input data 2" 1204 which is added this time, coordinate data 1403 of the locus input position in the file "01.jpg" which contains "3", coordinate data 1404 of the locus input position in the file "02.jpg" which contains "3", and coordinate data 1405 of the locus input position in the file "03.jpg" which contains "3" and is added this time.

As described above, when the shape of a locus that is registered in the dictionary is unsteady, the efficiency of classification and search can be improved by accumulating shape data.

Third Exemplary Embodiment

According to the first and second exemplary embodiments, the information processing apparatus is configured to classify and search content by an input of a locus of an arbitrary shape. An input unit implementing speech application can also be used for classification and search of content by the user viewing content, for example, on a television set. In this case, the position coordinate input unit 201 and the locus classification dictionary 304 of the first exemplary embodiment are replaced with a speech input unit and a speech classification dictionary. By replacing the position coordinate input unit 201 with a speech input unit, the usage configuration in FIG. 1 and the block diagram in FIG. 2 can be applied to an information processing apparatus according to the present exemplary embodiment.

Figure 16:
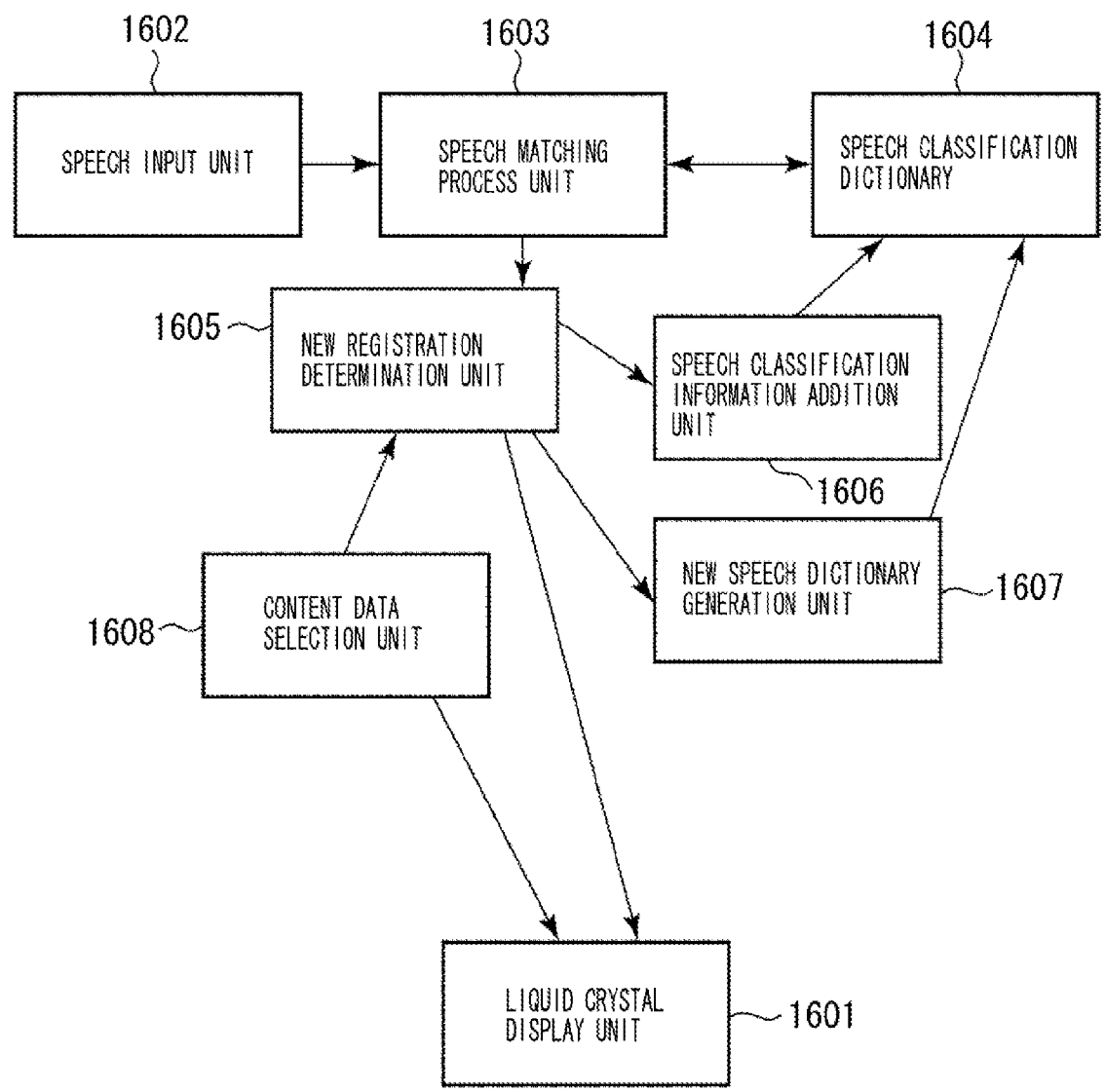
FIG. 16 is a diagram illustrating a configuration of an information processing apparatus according to a third exemplary embodiment of the present invention.

FIG. 16 is a diagram illustrating a configuration of an information processing apparatus according to the present exemplary embodiment. A speech input unit 1602 includes a microphone and an analog-to-digital (AD) converter. An input speech is captured as digital data. A speech matching processing unit 1603 performs matching between a feature of the input speech data with a feature of dictionary data. A suitable matching algorithm, including conventional speech recognition algorithm, can be used for this process.

A speech classification dictionary 1604 includes registered speech feature data and a file name of content data obtained at the time the speech feature is registered. A new registration determination unit 1605 calls a speech classification information addition unit 1606 if speech data corresponding to the input speech data is registered in the speech classification dictionary 1604. If the speech data corresponding to the input speech data is not registered in the speech classification dictionary 1604, the new registration determination unit 1605 calls a new speech dictionary generation unit 1607.

The speech classification information addition unit 1606 is configured to add current content information to matched speech data. The new speech dictionary generation unit 1607 is configured to add a feature of newly input speech data to the speech classification dictionary 1604. A content data selection unit 1608 selects and generates an instruction to display a content file on the screen of a liquid crystal display unit 1601.

FIG. 17 illustrates a data configuration of the speech classification dictionary 1604. One speech dictionary data includes speech feature data 1701 and speech volume information and file information 1702 to 1704 indicating a speech volume at the time of speech input and a file name of each content. For example, if a speech "flower" is input when a photograph of flowers is displayed, a speech feature of "flower" and a name "13.jpg (file name of the file which contains a photograph of flowers)" are recorded.

Figure 18:
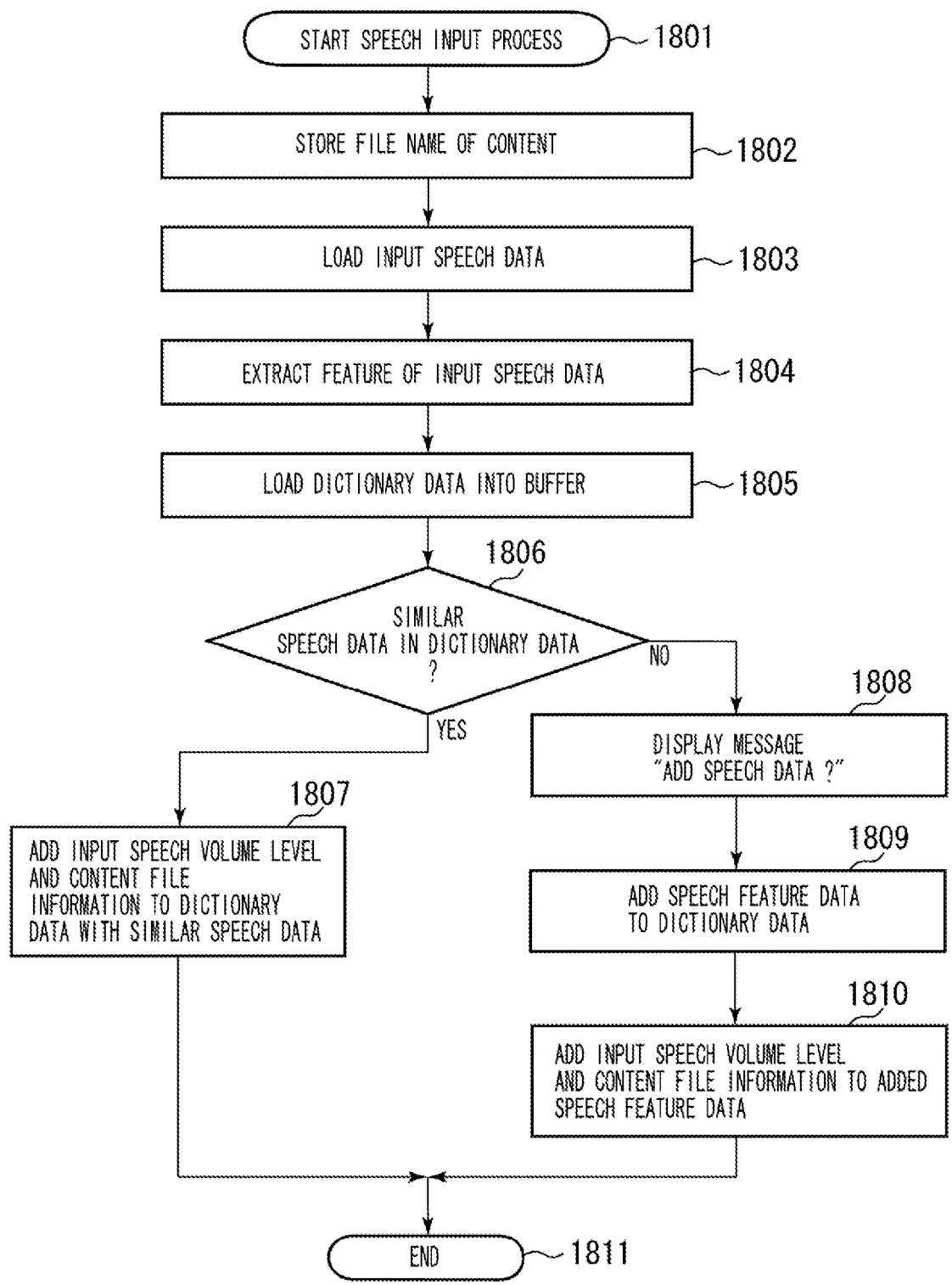
FIG. 18 is a flowchart illustrating an example of processing for speech classification information input to content according to the third exemplary embodiment of the present invention.

FIG. 18 is a flowchart illustrating an example of speech classification information input processing for content. Before this process starts, the user displays the content, holds a microphone, presses a start button, speaks into the microphone, for example, "Mike", and presses a record button. Then, the speech data is digitized and the processing starts. In step 1801, the CPU 203 starts the speech input processing for content. Storage of a storage buffer is allocated by the CPU 203. In step 1802, the CPU 203 stores a file name of content that is currently displayed. If a file "13.jpg", which is a photograph of flowers, is currently displayed, the CPU 203 stores the file name "13.jpg".

In step 1803, the CPU 203 loads the input speech data into the buffer. In step 1804, the CPU 203 extracts feature data from the loaded input speech data. For example, as discussed in Japanese Patent Application Laid-Open No. 2005-175839, speech data is converted into a feature parameter string. In step 1805, the CPU 203 loads the dictionary data illustrated in FIG. 17 into the buffer.

In step 1806, the CPU 203 determines whether speech data similar to the input speech data exists in the dictionary data. If similar speech data is found in the dictionary data (YES in step 1806), the process proceeds to step 1807. If similar speech data is not found in the dictionary data (NO in step 1806), the process proceeds to 1808. The CPU 203 performs matching between a feature parameter string of the input speech data with a feature parameter string of the registered speech data. If a degree of similarity of the dictionary data having the highest degree of similarity is greater than a predetermined threshold value, the CPU 203 determines that the input speech data is similar to the dictionary data.

In step 1807, the CPU 203 adds speech volume information and content file information to the matched speech dictionary data. For example, if the user speaks into the microphone "Mike" at a volume level of 25 decibel (dB) while viewing a file "16.jpg", the input speech data matches with the speech feature data "Mike" in the dictionary data in FIG. 17. Thus, information "speech volume 25 dB, 16.jpg" is added next to the information "speech volume 30 dB, 12.jpg" in the dictionary data in FIG. 17.

In step 1808, the CPU 203 displays a message for adding new speech data on the screen. This message is, for example, "Add this speech? Press "OK" for YES, or "CANCEL" for NO.". If OK is selected, then the process proceeds to step

1809. If CANCEL is selected, the process proceeds to step 1811 without registering new speech data.

In step 1809, the CPU 203 adds a feature parameter of the input speech data to the dictionary data. If, the user inputs "ocean" when the dictionary is in a state illustrated in FIG. 17, since "ocean" does not exist in the speech feature data in the dictionary in FIG. 17, the speech feature data of "ocean" is added to the dictionary after the dictionary data "scenery".

In step 1810, the CPU 203 adds speech volume information and content file information to the new speech feature data. For example, if the user inputs speech data "ocean" at 30 dB when the user is viewing a photograph of an ocean "16.jpg", since the feature of an ocean does not exist in the speech feature dictionary in FIG. 17, speech feature data "ocean" is added to the dictionary after the dictionary data "scenery". Further, information "speech volume 30 dB, 16.jpg" is also added to the new speech feature data. The speech classification dictionary 1604 is generated according to the above-described process.

FIG. 19 is a flowchart illustrating an example of search processing for content using a speech. When the user inputs a speech of the content to be searched for after selecting "speech input" from a search menu, the content search processing is started.

In step 1901, the CPU 203 starts the search process using a speech. The CPU 203 performs allocation of a storage buffer. In step 1902, the CPU 203 loads input speech data, which functions as a search key of the search process, into the buffer. In step 1903, the CPU 203 extracts feature data from the loaded speech data. For example, as discussed in Japanese Patent Application Laid-Open No. 2005-175839, the CPU 203 converts the speech data into a feature parameter string.

In step 1904, the CPU 203 determines a volume level of the input speech data. For example, if the user produces speech at 20 dB, the CPU 203 determines the volume level as 20 dB. In step 1905, the CPU 203 loads the dictionary data into the buffer. For example, the dictionary data illustrated in FIG. 17 is loaded into the buffer. In step 1906, the CPU 203 sorts the dictionary data according to a degree of similarity between the speech feature data in the dictionary data and the input speech feature data. If the user inputs a speech such as "scenery" and performs a search, data "scenery" and "speech volume 20 dB, 15.jpg" appears on the top in the dictionary data illustrated in FIG. 17.

In step 1907, the CPU 203 sorts the dictionary data according to a comparison of the volume level information contained in the dictionary data and the input speech volume information. For example, by a speech input of "Mike" at 30 dB, the dictionary data is sorted in order of data "speech volume 30 dB, 12.jpg" and "speech volume 20 dB, 11.jpg".

In step 1908, the CPU 203 generates and displays a thumbnail image of content corresponding to the sorted dictionary data. For example, if the result of the search is data "speech volume 30 dB, 12.jpg" and "speech volume 20 dB, 11.jpg", the CPU 203 reads image data of the file "12.jpg", generates a thumbnail image thereof, and displays the thumbnail image on the display screen. Next, the CPU 203 reads image data of the file "11.jpg", generates a thumbnail image thereof, and displays the thumbnail image on the display screen. In step 1909, the CPU 203 ends the search processing by speech.

With the above-described configuration, an information processing apparatus can classify content data with a speech and efficiently perform a search. Since a speech produced by the user is registered as speech data, enhanced search efficiency can be achieved.

The above-described exemplary embodiments can be also realized with, for example, a system, an apparatus, a method, a program, or a storage medium. Furthermore, the above-described exemplary embodiments can be realized by a system including a plurality of devices or an apparatus including a single device.

The present invention includes a case where the functions of the above-described exemplary embodiments are realized when a software program is supplied to a system or an apparatus directly or from a remote location, and a computer of the system or the apparatus executes the supplied program code to realize the functions of the above-described exemplary embodiments. In this case, the supplied program corresponds to the flowcharts illustrated in the figures in the above-described exemplary embodiments.

Accordingly, where program code is installed in the computer and executed by the computer to realize the functions of the present invention, the program code itself also configures the present invention. In other words, the present invention includes a computer-executable program configured to realize the processing of the functions of the above-described exemplary embodiments. In this case, the computer-executable program can be provided in the form of object code, a program executed by an interpreter, or script data supplied to an operating system, etc., if it functions as a program.

A recording medium used for supplying the program includes, for example, a flexible disk, a hard disk, an optical disk, a magneto-optical disc (MO), a compact disc read-only memory (CD-ROM), a compact disc-recordable (CD-R), a compact disc-rewritable (CD-RW), a magnetic tape, a non-volatile memory card, a read-only memory (ROM), a digital versatile disc (DVD) (digital versatile disc read-only memory (DVD-ROM), and digital versatile disc-recordable (DVD-R).

The program can also be supplied to a user connecting to an Internet website using a browser of a client computer and downloading the computer-executable program of the present invention into a recording medium, such as a hard disk. In this case, the program which is downloaded can be a compressed file having an automated install function.

Further, the program code that configures the program of the exemplary embodiments of the present invention can be divided into a plurality of files and each file can be downloaded from different Internet websites. In other words, a World Wide Web (WWW) server which allows a plurality of users to download a program file to realize the functions of the above-described exemplary embodiments also configures the present invention.

Furthermore, the program of the present invention can be encrypted, recorded on a recording medium, such as a CD-ROM, and delivered to users. In this case, a user who satisfies a predetermined condition is allowed to download encryption key information from an Internet website via the Internet, to decrypt the encrypted program using the encryption key information, and installs the decrypted program on the computer.

The functions of the above-described exemplary embodiments are implemented when the provided program is executed by a computer. Additionally, the program can be used together with an operating system running on a computer to realize the functions of the above-described exemplary embodiments. In this case, the operating system performs the whole or a part of the actual processing. The functions of the above-described exemplary embodiments are realized according to this processing.

Furthermore, the program read out from the recording medium can be stored in a memory equipped for a function expanding board or a function expanding unit connected to a computer to realize the whole or a part of the functions of the above-described exemplary embodiments. In this case, after the program is stored in the function expanding board or the function expanding unit, based on the instruction of the program, a CPU equipped for the function expanding board or the function expanding unit performs the whole or a part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-344275 filed Dec. 21, 2006, which is hereby incorporated by reference herein in its entirety.

What is claimed is:

1. An information processing apparatus comprising:
   a storage unit configured to store dictionary data in which one or more pieces of content and locus information on at least either a position or an area of locus input to the content are registered in association with a locus;
   a first input unit configured to input an arbitrary locus in association with content;
   a comparison unit configured to compare the arbitrary locus input by the first input unit and a locus registered in the dictionary data;
   an addition unit configured to add data to the dictionary data stored in the storage unit based on a comparison result generated by the comparison unit;
   a second input unit configured to input a locus;
   a detection unit configured to detect a locus similar in shape to a locus input by the second input unit from among loci stored in the dictionary data;
   a sorting unit configured to sort a plurality of contents corresponding to the locus detected by the detection unit based on the locus information on the locus input by the second input unit and the locus detected by the detection unit; and
   a display unit configured to display dictionary data corresponding to the contents sorted by the sorting unit.

2. An apparatus comprising:
   a storage unit configured to store dictionary data in which one or more pieces of content are registered in association with a locus;
   an input unit configured to input locus in association with content;
   a comparison unit configured to compare the locus input by the input unit and a locus registered in the dictionary data; and
   an addition unit configured to add data to the dictionary data stored in the storage unit based on a comparison result generated by the comparison unit,
   wherein, in a case where a degree of difference between the locus input by the input unit and the locus registered in the dictionary data is equal to or greater than a first predetermined threshold value but less than a second predetermined threshold value, the addition unit additionally registers the locus input by the input unit in association with a shape of the locus registered in the dictionary data.

3. A method comprising:
   storing dictionary data in which one or more pieces of content and locus information on at least either a position or an area of locus input to the content are registered in association with a locus;
   inputting an arbitrary locus in association with content;
   comparing the input arbitrary locus and a locus registered in the dictionary data;
   adding data to the dictionary data stored in the storage unit based on a comparison result generated by the comparing step;
   inputting a locus;
   detecting a locus similar in shape to the input locus from among loci stored in the dictionary data;
   sorting a plurality of contents corresponding to the locus detected by the detection step based on the locus information on the input locus and the locus detected by the detection step; and
   displaying dictionary data corresponding to the contents sorted by the sorting step.

4. A non-transitory computer-readable storage medium storing instructions which, when executed by an apparatus, cause the apparatus to perform the method according to claim 3.

5. The information processing apparatus according to claim 1, wherein, in a case where it is determined that the locus input by the first input unit is already registered in the dictionary data as a result of comparison by the comparison unit, the addition unit adds information on a content corresponding to the locus to the dictionary data.

6. The information processing apparatus according to claim 1, wherein, in a case where it is determined that the locus input by the first input unit is not registered, the addition unit adds the locus to the dictionary data as a new locus.

7. The information processing apparatus according to claim 1,
   wherein the storage unit stores a size of an area of a locus, small, medium or large as the locus information, and
   wherein, in a case where a size of an area of the locus detected by the detection unit is large, the sorting unit sorts the plurality of contents in association with a size of a corresponding locus, large, medium or small.

8. The information processing apparatus according to claim 1, wherein, in a case where an area of a locus input by the second input unit is equal to the area of the locus detected by the detection unit, the sorting unit sorts the plurality of contents in ascending order of distance between a position of the locus input by the second input unit and a position of the locus detected by the detection unit.

* * * * *